(12) United States Patent
Fujii

(10) Patent No.: US 9,083,409 B2
(45) Date of Patent: Jul. 14, 2015

(54) WIRELESS COMMUNICATION DEVICE, COMMUNICATION METHOD AND STORAGE MEDIUM

(75) Inventor: Daiki Fujii, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 329 days.

(21) Appl. No.: 13/614,664

(22) Filed: Sep. 13, 2012

(65) Prior Publication Data

US 2013/0093623 A1 Apr. 18, 2013

(30) Foreign Application Priority Data

Oct. 13, 2011 (JP) .................... 2011-226224

(51) Int. Cl.
*G01S 3/00* (2006.01)
*H04B 7/06* (2006.01)

(52) U.S. Cl.
CPC .................... *H04B 7/0617* (2013.01)

(58) Field of Classification Search
CPC .............. G01S 3/00; H01Q 1/00; H01Q 3/00
USPC ....................... 342/378, 373, 368
See application file for complete search history.

(56) References Cited

U.S. PATENT DOCUMENTS

| 7,164,932 B1 | 1/2007 | Sato et al. |
| 7,359,735 B2 | 4/2008 | Fujishima et al. |
| 8,508,409 B2* | 8/2013 | Hosoya et al. ................ 342/373 |
| 2011/0098010 A1* | 4/2011 | Mihota ......................... 455/101 |
| 2013/0010849 A1* | 1/2013 | Shimizu et al. .............. 375/219 |

FOREIGN PATENT DOCUMENTS

| JP | 2000-165959 A | 6/2000 |
| JP | 2003-110486 A | 4/2003 |
| JP | 2005-252521 A | 9/2005 |
| JP | 2010-161513 A | 7/2010 |
| WO | 2008-126857 A1 | 10/2008 |

OTHER PUBLICATIONS

Japanese Office Action dated May 8, 2015.

* cited by examiner

*Primary Examiner* — Harry Liu
(74) *Attorney, Agent, or Firm* — Fitzpatrick, Cella, Harper & Scinto

(57) ABSTRACT

A wireless communication device forms a second directivity response pattern having a null value in the direction of a main lobe of a first directivity response pattern, and communicates with a communication partner device by using the first directivity response pattern and the second directivity response pattern.

19 Claims, 11 Drawing Sheets

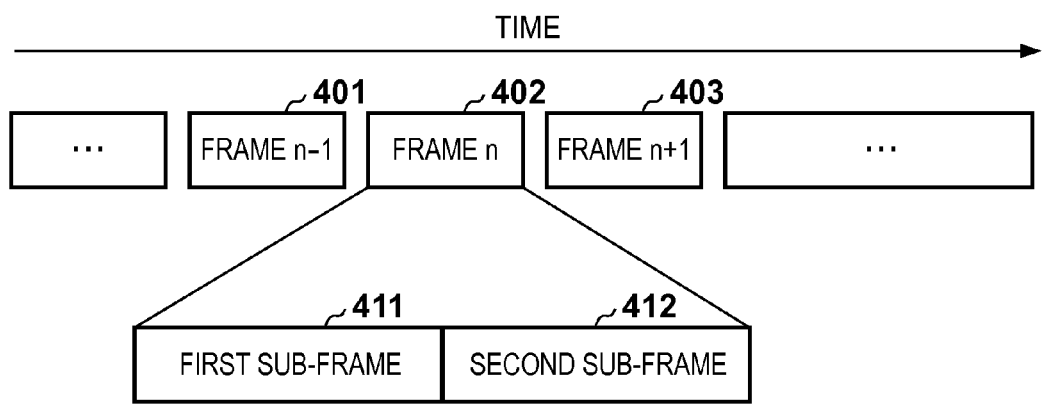
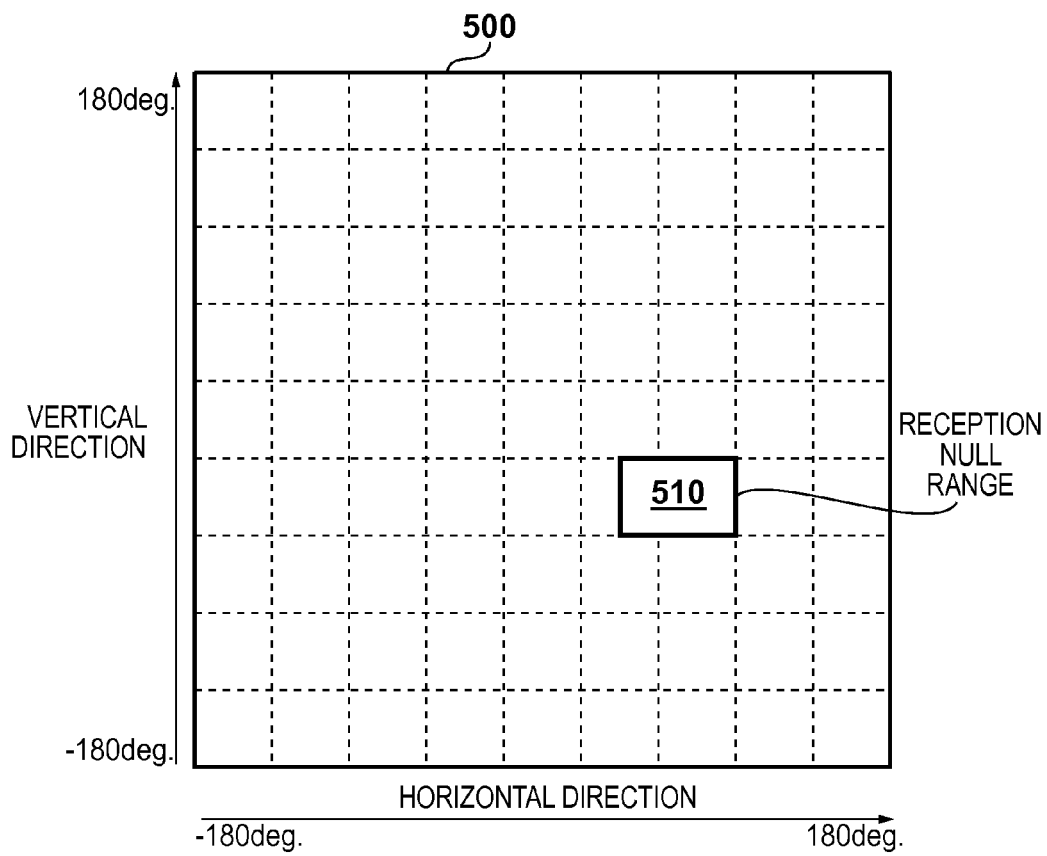

FIG. 11
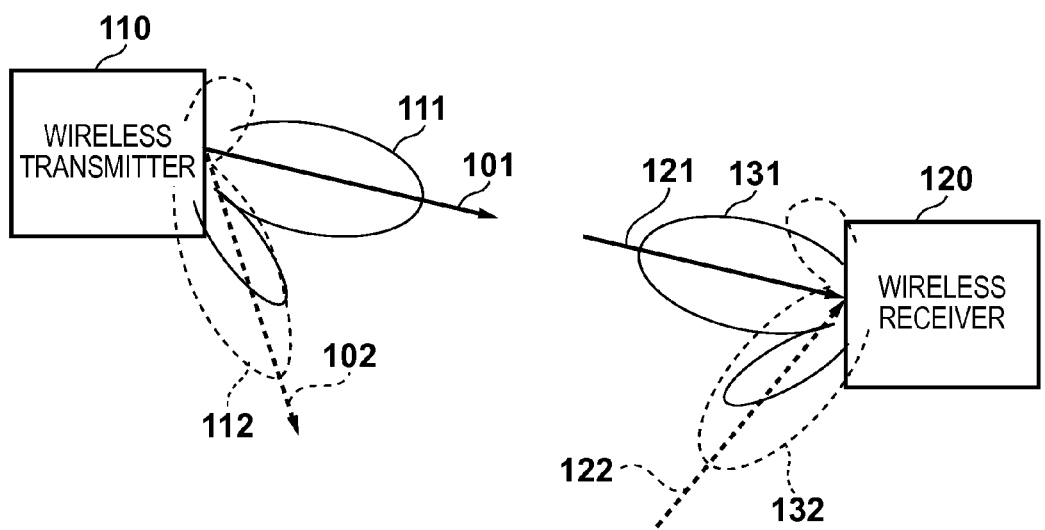
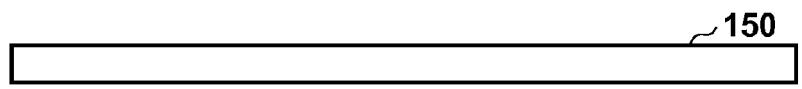

WIRELESS COMMUNICATION DEVICE, COMMUNICATION METHOD AND STORAGE MEDIUM

BACKGROUND OF THE INVENTION

1. Field of the Invention

The present invention relates to a wireless communication device, a communication method, and a storage medium, with which communication is performed by switching mutually different directivity response patterns formed by an adaptive array antenna.

2. Description of the Related Art

Millimeter wave wireless communication is a technique for realizing high-speed, large-capacity wireless communication. A characteristic of radio waves in the millimeter wave band is a high degree of straightness, so a problem is that communication tends to be disconnected if a person or other obstacle moves into the propagation path. A conventional attempt to deal with this problem was to transmit data using a plurality of different propagation paths between a wireless transmitter and a wireless receiver.

Japanese Patent Laid-Open No. 2000-165959 proposes a method for simultaneously receiving a direct wave and one or more reflected waves, each at the proper strength. With this method, even if one propagation path should be cut off, radio waves will arrive from other propagation paths, so the necessary received signal strength can be maintained. However, since radio waves are received simultaneously from a plurality of propagation paths, a new problem arises in that depending on the environment in which the wireless transmitter and wireless receiver are installed, there may be no room for the effect of frequency-selective fading.

As shown in FIG. 1, another method is to repeatedly transmit a signal produced from the same source data while switching the directivity response pattern in a wireless communication system including a wireless transmitter 110 and a wireless receiver 120 equipped with an adaptive array antenna. For example, let us term directivity response patterns having a main lobe in the direct wave direction a first transmission directivity response pattern 111 and a first reception directivity response pattern 131. Let us also term directivity response patterns having a main lobe in the direction in which radio waves arrive in a single reflection off of a wall or other such reflecting object 150 a second transmission directivity response pattern 112 and a second reception directivity response pattern 132. The redundancy of communication can be improved by repeatedly transmitting a signal using these two sets of directivity response pattern.

With a wireless communication system such as this, a test signal is transmitted ahead of data transmission, and the received signal strength thereof is observed. This makes it possible to select the first transmission directivity response pattern 111 and first reception directivity response pattern 131, and the second transmission directivity response pattern 112 and second reception directivity response pattern 132. However, even when using a directivity response pattern in which a direction free of any reflecting object 150 is used as the main lobe, if the side lobe level is high in the direct wave direction, a direct wave can still be transmitted and received at a sufficiently high power. Accordingly, as shown in FIG. 2, there will be cases in which a directivity response pattern having a relatively large side lobe in the direct wave direction is selected as the second transmission directivity response pattern 112 and the second reception directivity response pattern 132. This is particularly likely to happen when the distance from the reflecting object 150 is relatively far, the directivity response pattern has a main lobe in the reflecting object 150 direction, and reflected waves are received only at a relatively low power.

In this case, communication using the second transmission directivity response pattern 112 and the second reception directivity response pattern 132 is performed by a side lobe in the direct wave direction. Accordingly, a problem arises in that if an obstacle moves into the direct wave direction, communication with the first transmission directivity response pattern 111 and the first reception directivity response pattern 131, and communication with the second transmission directivity response pattern 112 and the second reception directivity response pattern 132 are simultaneously cut off.

Because of limitations on the time allowed for training of directivity response patterns, and mounting limitations such as the resolution of a phase shifter provided to an adaptive array antenna, the directions which can become a main lobe are discrete. Accordingly, the reception power may be higher with a directivity response pattern in which the maxima of the side lobes coincide in the direct wave direction than with a directivity response pattern in which the maxima of the side lobes are closest to the direct wave direction but offset slightly. In this case, unlike with the above-mentioned problem, communication with the first transmission directivity response pattern 111 and first reception directivity response pattern 131 is performed with a side lobe of the direct wave direction. Furthermore, when a directivity response pattern in which the maximum of the main lobe is closest to the direct wave direction is selected as the second transmission directivity response pattern 112 and the second reception directivity response pattern 132, communication ends up being performed using a direct wave for both sets of directivity response pattern. Accordingly, if a malfunction should occur in one communication path due to interruption of the direct wave or another such situation, communication with the two sets of directivity response pattern may be simultaneously cut off.

The present invention was conceived in light of the above problem, and provides a technique for utilizing a plurality of communication paths with different directivity response patterns.

SUMMARY OF THE INVENTION

According to one aspect of the present invention, there is provided a wireless communication device, comprising: a formation unit configured to form a second directivity response pattern having a null value in the direction of a main lobe of a first directivity response pattern; and a communication unit configured to communicate with a communication partner device by using the first directivity response pattern and the second directivity response pattern.

According to one aspect of the present invention, there is provided a wireless communication device, comprising: a communication unit configured to communicate by utilizing a plurality of spatial paths, including a first spatial path formed by a first directivity response pattern in which a first direction serves as a main lobe, and a second spatial path formed by a second directivity response pattern in which a second direction different from the first direction serves as a main lobe; and a determination unit configured to determine as the second direction the direction of the main lobe of a directivity response pattern having a null value in the first direction of the main lobe of the first directivity response pattern.

According to one aspect of the present invention, there is provided a wireless communication device, comprising: a formation unit configured to form a first directivity response pattern in which a first direction serves as a main lobe, and a second directivity response pattern in which a second direction serves as a main lobe, and a determination unit configured to determine the second direction on the basis of the communication quality with the directivity response pattern forming a null value in the first direction.

According to one aspect of the present invention, there is provided a communication method used in a wireless communication device; comprising: a formation step of forming a second directivity response pattern having a null value in the direction of a main lobe of a first directivity response pattern; and a communication step of communicating with a communication partner device by using the first directivity response pattern and the second directivity response pattern.

According to one aspect of the present invention, there is provided a communication method used in a wireless communication device, comprising: a communication step of communicating by utilizing a plurality of spatial paths, including a first spatial path formed by a first directivity response pattern in which a first direction serves as a main lobe, and a second spatial path formed by a second directivity response pattern in which a second direction different from the first direction serves as a main lobe; and a determination step of determining as the second direction the direction of the main lobe of a directivity response pattern having a null value in the first direction of the main lobe of the first directivity response pattern.

According to one aspect of the present invention, there is provided a communication method used in a wireless communication device, comprising: a formation step of forming a first directivity response pattern in which a first direction serves as a main lobe, and a second directivity response pattern in which a second direction serves as a main lobe, wherein in the formation step, the second direction is selected on the basis of a signal reception state in a directivity response pattern forming a null value in the first direction.

Further features of the present invention will be apparent from the following description of exemplary embodiments with reference to the attached drawings.

BRIEF DESCRIPTION OF THE DRAWINGS

FIG. 4 is a diagram of the configuration of communication frames.

FIG. 5 illustrates a reception null table.

FIG. 11 is a diagram of the configuration of the wireless communication system according to Embodiment 2.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Wireless Communication System

Figure 1:
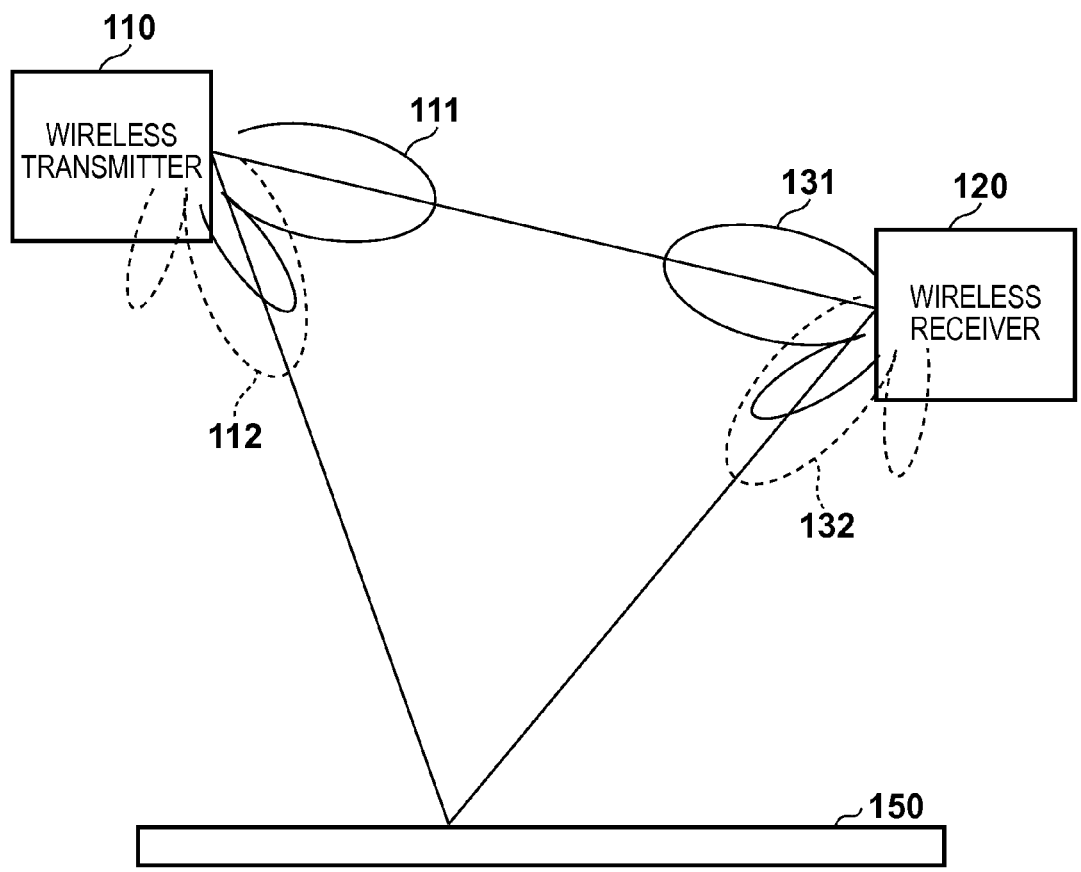
FIG. 1 is a diagram of the configuration of a conventional wireless communication system.
Figure 2:
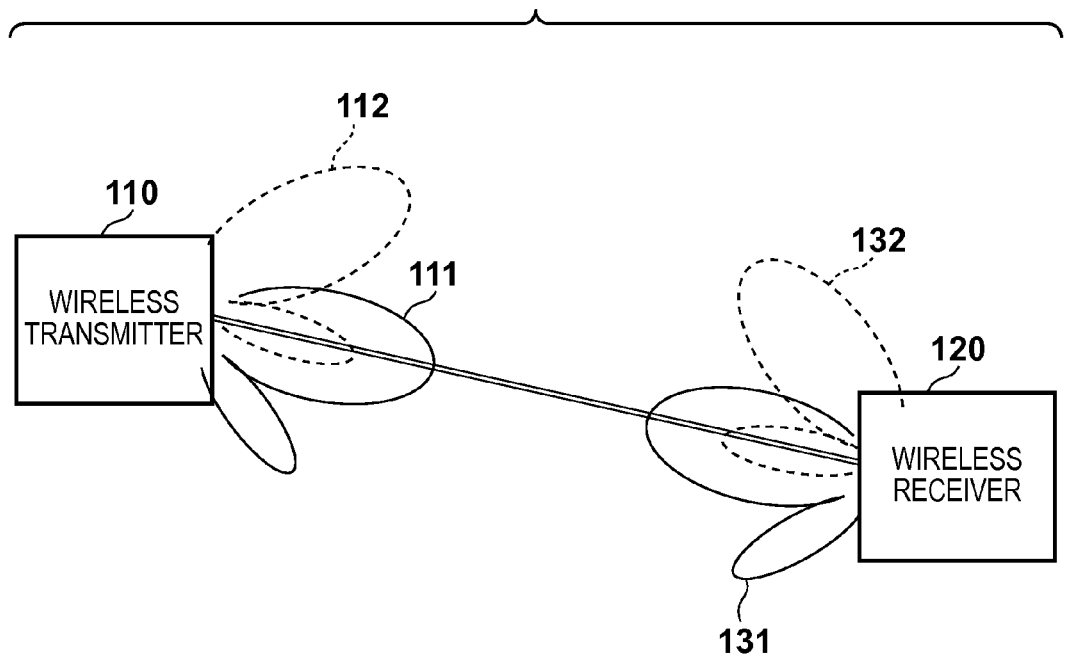
FIG. 2 shows problems encountered with a conventional wireless communication system.
Figure 3:
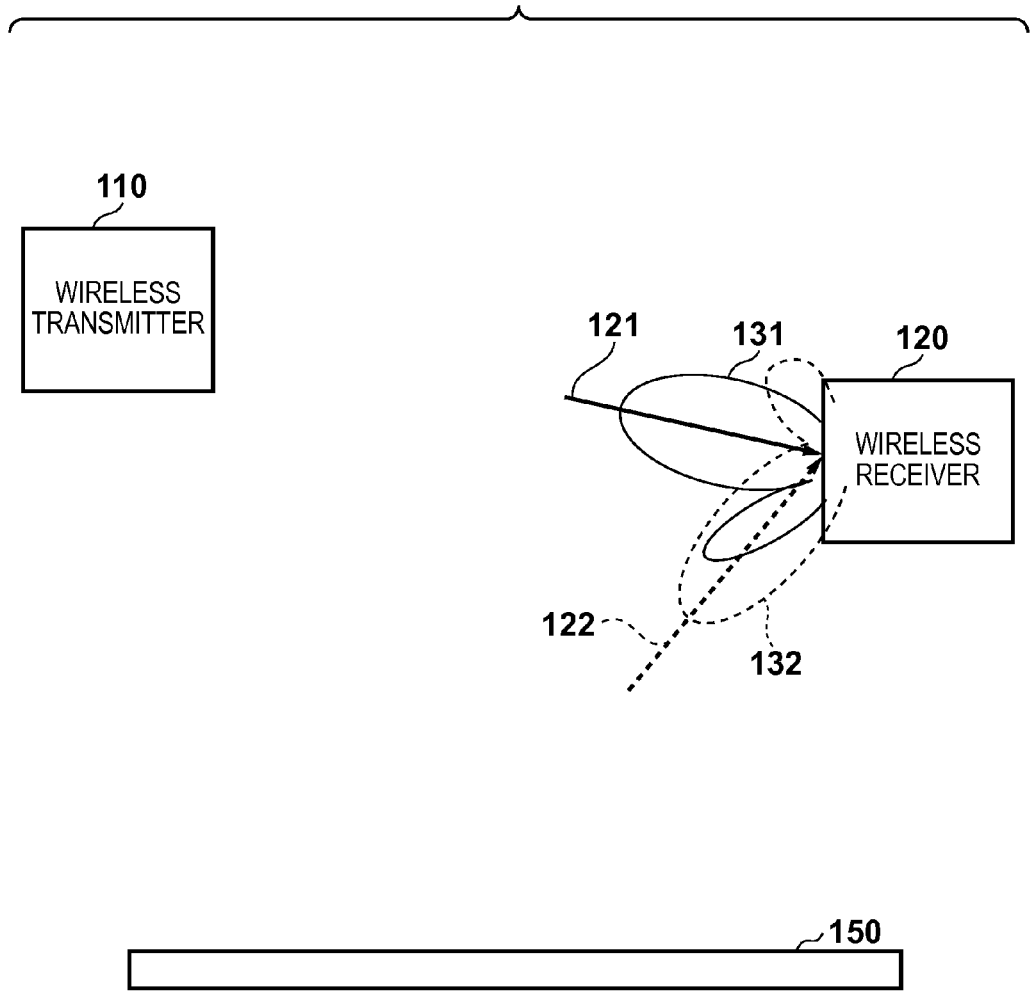
FIG. 3 is a diagram of the configuration of the wireless communication system according to Embodiment 1.

FIG. 3 is a diagram of an example of the configuration of the wireless communication system in Embodiment 1. A wireless transmitter 110 transmits a plurality of signals produced from the same source data at different times. These signals are signals produced by splitting up the source data into a plurality of groups, or signals whose waveforms have been formed by varying the coding rate and/or the modulation method of the source data, or the same signal produced from source data. A case of two signals will be described in the following example, while a case of three or more signals will be described in Embodiment 3.

A wireless receiver 120 forms a plurality of reception directivity response patterns (in the example in the drawings, the two of the first reception directivity response pattern 131 represented by solid lines and the second reception directivity response pattern 132 represented by broken lines), and receives the above-mentioned two signals. In the following discussion, unless there would be some confusion, the first reception directivity response pattern 131 will be called the first directivity response pattern 131, and the second reception directivity response pattern 132 will be called the second directivity response pattern 132. The wireless receiver 120 obtains reception data by subjecting the two received signals to specific processing. The "specific processing" here is, for example, processing to combine data obtained by demodulating two signals, or processing to demodulate after two signals have been weighted and combined. The first directivity response pattern 131 is a reception directivity response pattern that forms a main lobe in a first direction 121. The second directivity response pattern 132 is a reception directivity response pattern that forms a null value in the first direction 121 and forms a main lobe in a second direction 122. The null reception gain and transmission gain do not have to be completely zero, as long as they are low enough not to affect the attainment of the desired communication quality.

The wireless transmitter 110 and the wireless receiver 120 are terms used to clarify that they are communication partners, but actually the functions of both the wireless transmitter 110 and the wireless receiver 120 may be combined in a single wireless communication device. Also, the wireless communication device may be equipped with only the wireless transmitter 110 or the wireless receiver 120.

Configuration of Communication Frames

Next, an example of the configuration of communication frames in this embodiment will be described through reference to FIG. 4. The wireless transmitter 110 transmits frames 401 to 403 in a time slot allocated according to a specific standard. The frames 401 to 403 are made up of a first sub-frame 411 and a second sub-frame 412. The first sub-frame 411 and the second sub-frame 412 are made up of signals produced from the same source data. The wireless receiver 120 receives the first sub-frame 411 with the first directivity response pattern 131, and receives the second sub-frame 412 with the second directivity response pattern 132. Taking into account the time it takes to switch between the first directivity response pattern 131 and the second directivity response pattern 132 in the wireless receiver 120, guard time may be provided between the first sub-frame 411 and the second sub-frame 412. Also, a plurality of sub-frames may be readied according to the number of reception directivity response patterns being used. Also, if a directivity response pattern that is usually used and an extra directivity response pattern are readied, and communication is performed by using the extra directivity response pattern when the communication quality of the usually used directivity response pattern has decreased, then the frames do not need to be split into sub-frames.

Reception Null Table

A reception null table 500 provided to the wireless receiver 120 in this embodiment will now be described through reference to FIG. 5. The reception null table 500 is a table that manages the range of null settings in establishing the second directivity response pattern 132. If the wireless receiver 120 controls the directivity response to the vertical and horizontal directions, the reception null table 500 is a two-dimensional table in the vertical and horizontal directions. If the wireless receiver 120 controls the directivity response to only the vertical direction or the horizontal direction, then the reception null table 500 may be a one-dimensional table.

A reception null range 510 is set in the selection of the reception-use second direction 122, or in the re-selection of the second direction 122. The second directivity response pattern 132 is established as a reception directivity response pattern that forms a null value in the reception null range 510 and also has a main lobe in the second direction 122.

Configuration of Wireless Receiver

Figure 10:
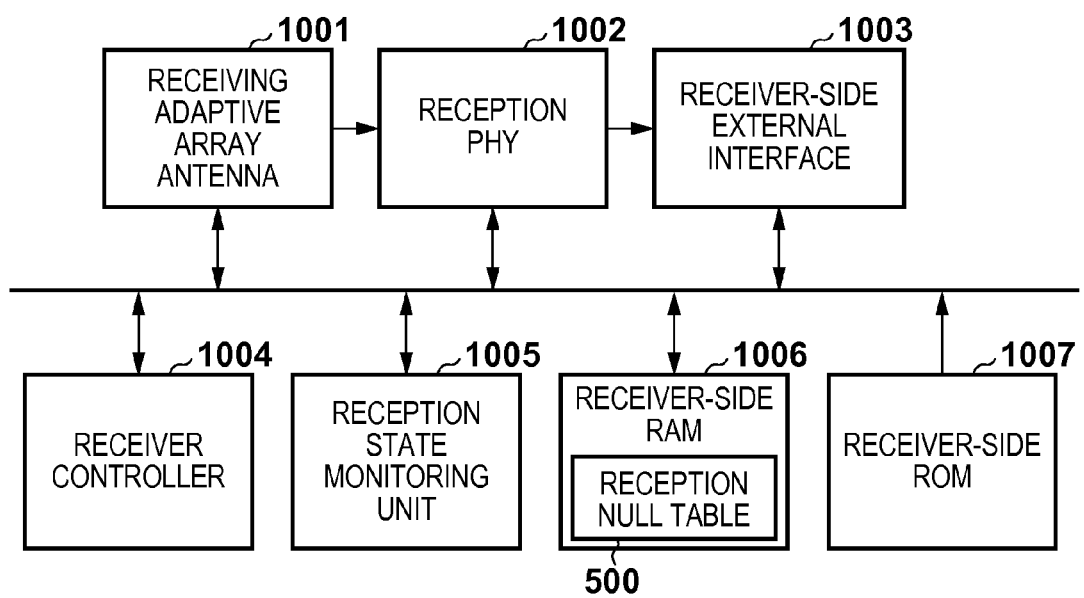
FIG. 10 is a block diagram of an example of the configuration of a wireless receiver.

FIG. 10 is a block diagram of an example of the configuration of the wireless receiver 120 in this embodiment. A receiving adaptive array antenna 1001 is a reception unit for receiving wireless signals by varying a reception directivity response pattern, and outputs received wireless signals to a reception PHY 1002. The receiving adaptive array antenna 1001 may have a beam formation controller (not shown) for variably controlling the reception directivity response pattern. The role of this beam formation controller may also be played by a receiver controller 1004 (discussed below). The reception PHY 1002 is a function block that performs signal processing of the physical layer, which obtains reception data by demodulating signals inputted from the receiving adaptive array antenna 1001. The reception data is outputted to a receiver-side external interface 1003. The receiver-side external interface 1003 converts the reception data inputted from the reception PHY 1002 into a suitable format, and outputs it to an external device connected to the wireless receiver 120. The receiver controller 1004 controls the operation of the entire wireless receiver 120. A reception state monitoring unit 1005 monitors the reception state of a first training signal (S710 to S712) and the reception state of a second training signal (S810 to S812). A receiver-side RAM 1006 temporarily stores parameters and data. The reception null table 500 is stored in the receiver-side RAM 1006. A receiver-side ROM 1007 stores nonvolatile parameters and programs of the wireless receiver 120.

Method for Determining Reception Directivity Response Pattern

Next, an example of the method for forming the second directivity response pattern 132 in this embodiment will be described. An antenna weight vector W is defined by the following equation, where K is the number of antenna elements of an adaptive array antenna.

$$W=[w_1 \ldots w_k \ldots w_K] \quad \text{(Formula 1)}$$

$w_k$ is the antenna weight of the k-th antenna element. The amplitude and phase of a received signal are controlled by multiplying the antenna weight $w_k$ by a signal received by the k-th antenna element.

Taking element directivity response into account, the array response vector V is defined by the following equation.

$$V(\theta,\phi)=[v_1(\theta,\phi) \ldots v_k(\theta,\phi) \ldots v_K(\theta,\phi)] \quad \text{(Formula 2)}$$

$v_k(\theta,\phi)$ is the array response of the k-th antenna element. The amplitude and phase of $v_k(\theta,\phi)$ are respectively expressed by the amplitude difference and phase difference with the k-th antenna element and the reference point of radio waves arriving from the adaptive array antenna in the horizontal direction of $\theta$ and the vertical direction of $\phi$.

Here, the antenna weight vector W forming the second directivity response pattern 132 can be an eigenvector corresponding to the maximum eigenvalue of the next matrix X, for example.

$$X=(R+N)^{-1}S \quad \text{(Formula 3)}$$

R is a matrix of K lines and K columns, and the i line and j column component thereof is expressed by the following equation.

$$r_{ij} = \int_{Null}\int v_i^*(\theta, \phi) v_j(\theta, \phi) d\theta d\phi \quad \text{(Formula 4)}$$

Here, $$\int_{Null}\int f(\theta, \phi) d\theta d\phi$$

refers to numerical integration in the reception null range 510 of the function $f(\theta,\phi)$, and $f^*(\theta,\phi)$ refers to complex conjugation of the function $f(\theta,\phi)$.

Also, if we let I be a unit matrix of K lines and K columns, then N is defined by the following equation.

$$N=\sigma I \quad \text{(Formula 5)}$$

Here, $\sigma$ is a positive real number, and is a parameter that affects the amount of reception power from the reception null range 510. The larger is the value to which $\sigma$ is set, the greater is the reception power from the reception null range 510.

If we let $\theta_2$ be the vertical component of the second direction 122, and $\phi_2$ be the horizontal component, then S is defined by the following equation.

$$S=V^H(\theta_2,\phi_2)V(\theta_2,\phi_2) \quad \text{(Formula 6)}$$

Here, $Z^H$ refers to a complex conjugate transpose of a matrix Z.

The second directivity response pattern 132 set forth in the above example is a directivity response pattern that allows the following evaluation function g to be the maximum.

$$g = \frac{[\text{reception power from second reception direction (120)}]}{[\text{reception power from reception null range (310)}] + [\text{psuedo noise power}]} \quad \text{(Formula 7)}$$

Here, the pseudo noise power is the value of the above-mentioned $\sigma$.

The eigenvector corresponding to the second-largest and subsequent eigenvalues of X may be used as the antenna weight vector W as long as the reception power of the second direction 122 is large enough, and the reception power from the reception null range 510 is small enough, that the desired communication quality can be achieved.

Operation of Wireless Communication System

Figure 6:
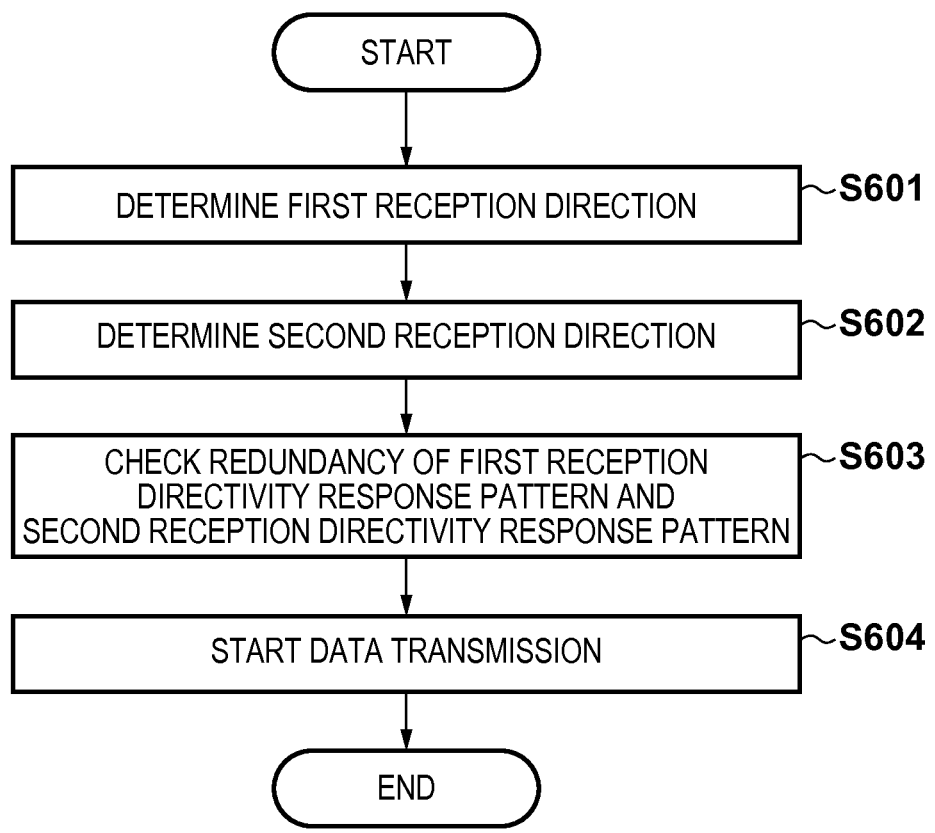
FIG. 6 is a flowchart of the operation of the wireless communication system according to Embodiment 1.
Figure 7:
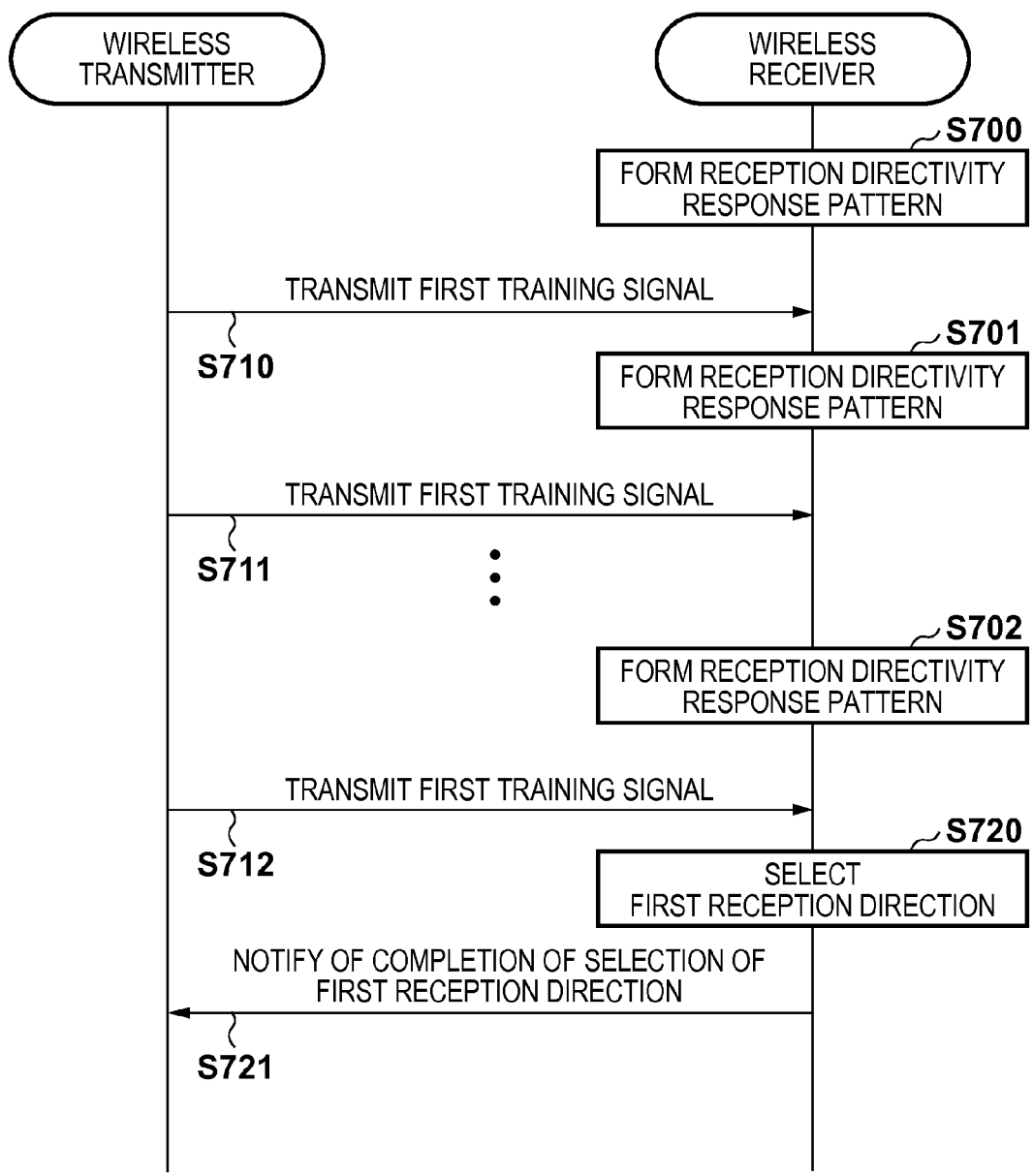
FIG. 7 is a sequence diagram showing the operation of selecting a reception-use first direction.

Next, the operation of the wireless communication system in this embodiment will be described through reference to FIG. 6. First, the reception-use first direction 121 is selected from among a plurality of candidates for the first reception direction (S601). The operation of selecting the reception-use first direction 121 will now be described through reference to FIG. 7. We shall let A be the number of candidates for the first reception direction, and let $a_1, a_2, \ldots, a_A$ be the candidates for the first reception direction.

The wireless transmitter 110 continuously sends a first training signal (S710 to S712). Upon completion of the transmission of one first training signal, the next first training signal may be sent continuously, or the next first training signal may be sent after a certain amount of time has elapsed.

The wireless receiver 120 forms a reception directivity response pattern having its main lobe in the $a_1$ direction (S700), and receives a first training signal (S710). Similarly, the wireless receiver 120 forms a reception directivity response pattern having its main lobe in the $a_2$ direction (S701), and receives a first training signal (S711). Thereafter, in the same manner, the wireless receiver 120 forms a reception directivity response pattern having its main lobe in the $a_1$ to $a_A$ directions (S700 to S702), and receives first training signals (S710 to S712). The first training signal may be, for example, a signal that conforms to the HRP preamble of IEEE 802.15.3c AV/PHY.

When first training signals are received for candidates in all of the first reception directions, the wireless receiver 120 selects as the first direction 121 the reception direction with the best communication quality for the first training signal (signal reception quality) (S720). For instance, the wireless receiver 120 selects the reception direction with the highest reception signal strength as the first direction 121. Upon completing the selection of the first direction 121, the wireless receiver 120 notifies the wireless transmitter 110 to this effect (S721). A communication method that does not require training for directivity response control can be used for notification of the completion of selection of the first reception direction, and IEEE 802.15.3c AV/PHY LRP may be used, for example. As discussed above, first a plurality of reception directivity response patterns are formed in a state in which there is no need to form a null value in any direction, and the one with the best communication quality is selected from among these. This allows the reception direction with which the best communication quality can be ensured to be determined, such as the arrival direction of a direct wave direction. In this description, the reception direction with the best communication quality is selected as the reception-use first direction 121, but any reception direction that exceeds a specific threshold out of the communication quality that allows wireless communication may be selected. Specifically, whether or not the communication quality exceeds a specific threshold may be examined for all of the first reception direction candidates, and the reception-use first direction 121 determined from among the candidates that exceeded this threshold.

Figure 8:
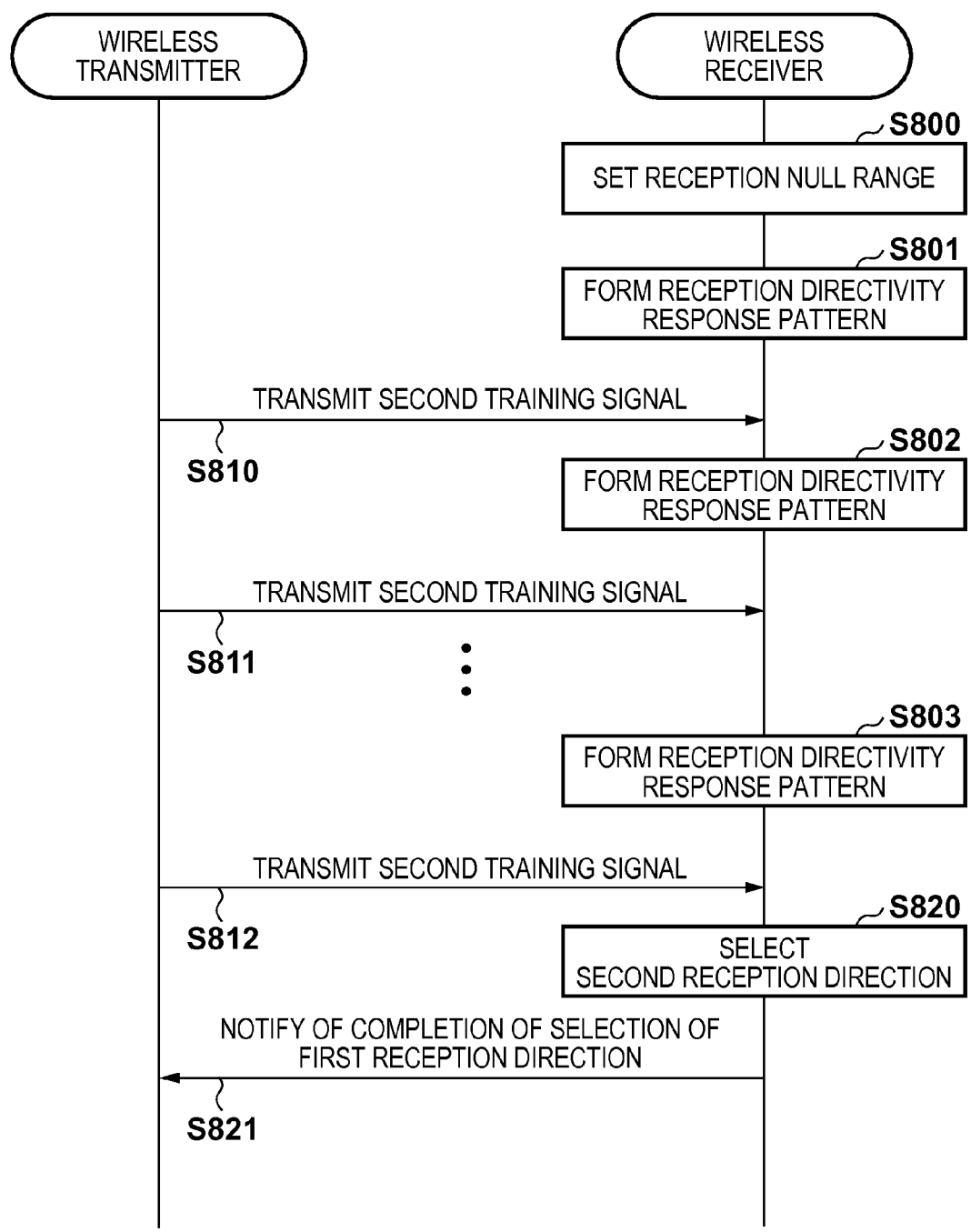
FIG. 8 is a sequence diagram showing the operation of selecting a reception-use second direction.

Returning to FIG. 6, after S601 the second direction 122 is selected from among a plurality of candidates for the second reception direction (S602). The operation of selecting the second direction 122 will now be described through reference to FIG. 8. We shall let B be the number of candidates for the second reception direction, and let $b_1, b_2, \ldots, b_B$ be the candidates for the second reception direction. We shall also let $\theta_1$ be the vertical component of the first direction 121, and $\phi_1$ the horizontal component.

The wireless receiver 120 sets the first direction 121 and the nearby directions to the reception null range 510 (S800). For example, the wireless receiver 120 sets the range of the vertical direction of the reception null range 510 to between $\theta_1 - d_v/2$ and $\theta_1 + d_v/2$. The wireless receiver 120 also sets the range of the horizontal direction of the reception null range 510 to between $\phi_1 - d_h/2$ and $\phi_1 + d_h/2$. Here, $d_v$ and $d_h$ are parameters that establish the width of the null value for the vertical and horizontal directions, respectively.

The wireless transmitter 110 continuously sends second training signals (S810 to S812). Upon completion of the transmission of one second training signal, the next second training signal may be sent right away, or the next second training signal may be sent after a specific length of time has elapsed.

The wireless receiver 120 forms a reception directivity response pattern having its main lobe in the $b_1$ direction under the condition that the reception null range 510 is null (S801), and receives a second training signal (S810). Similarly, the wireless receiver 120 forms a transmission directivity response pattern having its main lobe in the $b_2$ direction under the condition that the reception null range 510 is null (S802), and receives a second training signal (S811). In the same manner, the wireless receiver 120 forms reception directivity response patterns having main lobes in the $b_1$ to $b_B$ directions under the condition that the reception null range 510 is null (S801 to S803). The wireless receiver 120 then receives second training signals in the reception directivity response patterns thus formed (S810 to S812). The second training signal may be, for example, a signal that conforms to the HRP preamble of IEEE 802.15.3c AV/PHY.

When second training signals have been received for all of the candidates in the second reception direction, the wireless receiver 120 selects as the second direction 122 the direction with the best reception state for second training signals (S820). For example, the wireless receiver 120 selects as the second direction 122 the reception direction with the highest reception signal strength, and selects as the second directivity response pattern the directivity response pattern having its main lobe in this second direction 122. When the selection of the second direction 122 is complete, the wireless receiver 120 notifies the wireless transmitter 110 to this effect (S821). A notification method that does not require training for directivity response control can be used for notification of the completion of second direction 122 selection here. For instance, IEEE 802.15.3c AV/PHY LRP may be used. Thus, in step S602, second training signals are received for a plurality of reception directivity response patterns having a null value in the previously selected reception directions, and of these, the one with which the best communication quality can be ensured is selected. This allows a reception directivity response pattern that has no side lobe in the previously selected reception directions to be reliably selected. Furthermore, using this reception directivity response pattern allows the signal with the best communication quality to be identified from among the signals received through a communication path other than the communication paths corresponding to the previously selected reception directions, and allows communication to be performed using this signal. As a result, even if some of the plurality of communication paths are interrupted, communication can still continue. In this description, the reception directivity response pattern with the best communication quality was selected from among a plurality of reception directivity response patterns having a null value in the previously selected reception directions, but any reception directivity response pattern that exceeds a specific threshold of communication quality that allows wireless communication may be selected. Specifically, whether or not the communication quality exceeds a specific threshold may be examined for all of the candidates for the second reception direction, and the reception-use second direction 122 determined from among those candidates that exceed the threshold.

Figure 9:
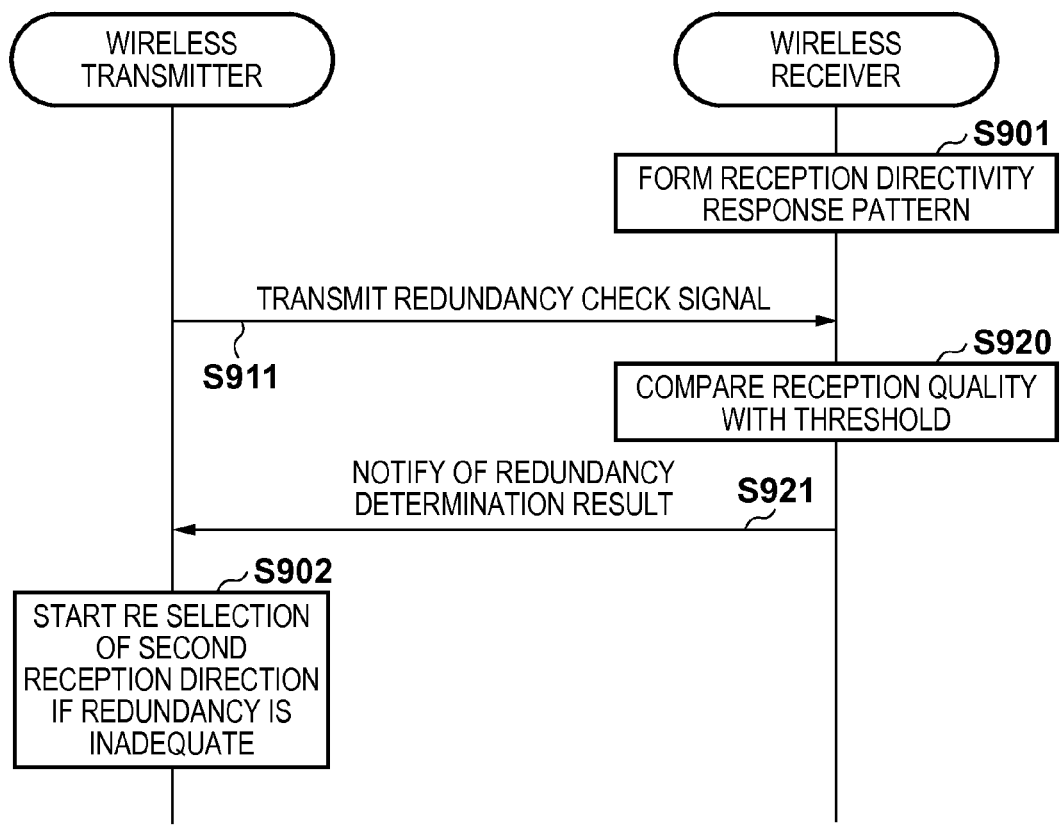
FIG. 9 is a sequence diagram showing the operation of checking the redundancy of two reception directivity response patterns.

Returning to FIG. 6, after S602 the redundancy of the first directivity response pattern 131 and the second directivity response pattern 132 is checked (S603). If the checking result in S603 is a decision that redundancy is inadequate, then the reception-use second direction 122 is re-selected. The operation of checking the redundancy of two reception directivity response patterns will now be described through reference to FIG. 9.

The wireless transmitter 110 sends out a redundancy check signal (S911). The redundancy check signal is, for example, a signal that conforms to the HRP preamble of IEEE 802.15.3c AV/PHY. Checking redundancy means checking whether or not a plurality of communication paths can be ensured with a communication partner.

The wireless receiver 120 forms a reception directivity response pattern having its main lobe in the first direction 121 under the condition that the area around the second direction 122 is null (S901), and receives a redundancy check signal (S911). For example, if the second direction 122 in the vertical direction is $\theta_2$, we shall let the null range of the reception directivity response pattern in the vertical direction be between $\theta_2-d_v/2$ and $\theta_2+d_v/2$. Similarly, if the second direction 122 in the horizontal direction is $\phi_2$, we shall let the null range of the reception directivity response pattern in the horizontal direction be between $\phi_2-d_h/2$ and $\phi_2+d_h/2$. A reception directivity response pattern having its main lobe in the first direction 121 is formed under this condition. Specifically, a reception directivity response pattern having its main lobe in one of the directions selected for reception use (the first direction 121) and having a null value in the other selected direction (the second direction 122) is formed.

The wireless receiver 120 compares the communication quality of the redundancy check signal with a specific predetermined quality, and checks whether or not it exceeds this specific quality, that is, whether or not the redundancy is adequate or inadequate (S920). For example, if the communication quality exceeds a specific threshold, it is decided that the redundancy is adequate, and otherwise it is inadequate. The wireless receiver 120 then notifies the wireless transmitter 110 of the redundancy decision result (S921). A communication method that does not require training for directivity response control can be used in this notification of redundancy decision result, and IEEE 802.15.3c AV/PHY LRP may be used, for example. In this embodiment, this redundancy check is performed because there are situations in which communication quality will be unsatisfactory if a null value is formed in the second direction 122 in the reception directivity response pattern having its main lobe in the first direction 121. As discussed above, in this redundancy check, the communication quality of a signal is examined and checked when using a reception directivity response pattern having its main lobe in a direction other than the last selected direction and having a null value in other directions including the last selected reception-use direction. If the communication quality meets the specified quality, then signals can be received through reception paths with different selected directions. If all of the selected directions are thus examined and communication is performed by forming a directivity response pattern that gave at least the specified level of communication quality in examination, then communication can be continued even if some of the plurality of reception paths becomes disconnected.

The wireless transmitter 110 begins the re-selection of the reception-use second direction 122 if a notification to the effect that redundancy is inadequate is received in S921 (S902). For example, to carry out the re-selection of the second direction 122, the wireless transmitter 110 begins sending second training signals. In the re-selection of the second direction 122 here, the first direction 121 (or its surrounding area) and the second direction 122 (or its surrounding area) may be reset as the reception null range 510 in S800 in FIG. 8. For example, $\theta_1-d_v/2$ to $\theta_1+d_v/2$ and $\theta_2-d_v/2$ to $\theta_2+d_v/2$ may be used as the reception null range 510 in the vertical direction. Similarly, $\phi_1-d_h/2$ to $\phi_1+d_h/2$ and $\phi_2-d_h/2$ and $\phi_2+d_h/2$ may be used as the reception null range 510 in the horizontal direction. This allows directivity response pattern candidates to be reformed so that the last selected direction is not re-selected.

Also, a plurality of candidates for the reception directivity response pattern in which the area surrounding the first direction 121 is set as the reception null range 510 in the first selection may be stored in advance, and candidates whose redundancy is inadequate excluded from the candidates for re-selection. This prevents candidates whose redundancy is inadequate from being selected again in re-selection. In this case, a plurality of candidates for reception directivity response pattern are stored in a memory unit of the wireless receiver 120 until the reception directivity response pattern to be used is established. Candidates for reception directivity response pattern can be stored by storing an antenna weight to be multiplied. Also, candidates for reception directivity response pattern are stored in association with information about whether or not those candidates were selected in the past. This makes it possible to identify candidates whose redundancy was inadequate in the past. Also, information may be deleted from the memory unit for any candidates with inadequate redundancy.

Returning to FIG. 6, when the redundancy check (S603) is complete, the wireless transmitter 110 begins data transfer (S604). The wireless transmitter 110 sends the frames 401 to 403 to the wireless receiver 120. After the start of data transfer, the wireless receiver 120 may re-select the first direction 121 or the second direction 122, or both. In this case, the wireless receiver 120 may notify the wireless transmitter 110 to perform re-selection.

Embodiment 2

In Embodiment 1, the reception directivity response pattern of a wireless receiver was switched at each sub-frame. In this embodiment, the transmission directivity response pattern of a wireless transmitter is switched at each sub-frame. The configuration of the communication frames in this embodiment is the same as in Embodiment 1. This embodiment will be described through reference to FIG. 11.

FIG. 11 is a diagram of an example of the configuration of the wireless communication system according to this embodiment. The wireless transmitter 110 sends two transmission signals produced from the same source data in the first sub-frame 411 and the second sub-frame 412, respectively. The wireless transmitter 110 sends the first sub-frame 411 in the first transmission directivity response pattern 111, and sends the second sub-frame 412 in the second transmission directivity response pattern 112.

The first transmission directivity response pattern 111 is a directivity response pattern in which the main lobe is formed in a transmission-use first direction 101. The second transmission directivity response pattern 112 is a directivity response pattern in which a null value is formed in the first direction 101 or its surroundings, and the main lobe is formed in a transmission-use second direction 102. The second transmission directivity response pattern 112 is formed, for example, by using an eigenvector corresponding to the maximum eigenvalue of X defined in Formula 3 as an antenna weight, just as in Embodiment 1.

The wireless receiver 120, which is a communication partner device to the wireless transmitter 110, obtains reception data by subjecting two received signals to specific processing, just as in Embodiment 1. Also, the wireless receiver 120 may receive the first sub-frame 411 in the first directivity response pattern 131, and receive the second sub-frame 412 in the second directivity response pattern 132, just as in Embodiment 1.

The transmission-use first direction 101 is selected from among a plurality of candidates for the transmission-use first direction. For example, just as in FIG. 7, it may be selected as follows. The wireless transmitter 110 continuously sends first training signals in transmission directivity response patterns whose main lobes are a plurality of candidates for the transmission-use first direction (S710 to S712). The wireless receiver 120 selects as the first direction 101 the transmission direction of the first training signal with the best reception state, and notifies the wireless transmitter 110 of the selected transmission-use first direction 101. If the wireless receiver 120 does not know the transmission direction of a first training signal, the number of first training signals received may be counted, and the wireless transmitter 110 notified of the order number in which the first training signal with the best reception state was received. Thus, the transmission-use first direction 101 that affords the best communication quality, such as a direct wave direction, is first selected in a state in which there is no restriction of forming a null value. Consequently, it is possible to determine a transmission direction that will be normally used between the wireless transmitter 110 and its communication partner device (the wireless receiver 120), for example. A direction in which the communication quality is not the best may not be selected, and any transmission direction that satisfies a specific level of quality may be selected as the transmission-use first direction 101. Specifically, all of the candidates for the transmission direction may be examined for whether or not the communication quality exceeds the specified quality, and the transmission-use first direction 101 may be selected from among those transmission directions in which the communication quality does exceed the specified quality.

Also, the wireless receiver 120 may use the first directivity response pattern 131 and the second directivity response pattern 132. In this case, the state of reception of the first training signals is monitored for all pairs of candidates for the transmission-use first direction and candidates for the first reception direction (S710 to S712). The transmission direction and reception direction with the best communication quality are then selected as the pair of the transmission-use first direction 101 and the reception-use first direction 121. A direction in which the communication quality is not the best may not be selected, and any transmission direction and reception direction that satisfy a specific level of quality may be selected as the pair of the transmission-use first direction 101 and the reception-use first direction 121. Specifically, all of the candidates for the paired transmission direction and reception direction may be examined for whether or not the communication quality exceeds the specified quality, and a pair of the transmission-use first direction 101 and reception-use first direction 121 may be selected from among those pairs in which the communication quality does exceed the specified quality.

The transmission-use second direction 102 is selected from among a plurality of candidates for the transmission-use second direction. For example, just as in FIG. 8, a direction is selected as follows. The wireless transmitter 110 sets the transmission-use first direction 101 and its surroundings to the transmission null range. The wireless transmitter 110 also continuously sends second training signals in transmission directivity response patterns whose main lobes are the candidates for the transmission-use second direction (S810 to S812). The wireless receiver 120 selects as the second direction 102 the transmission direction of the second training signal with the best reception state, and notifies the wireless transmitter 110 of the selected transmission-use second direction 102. If the wireless receiver 120 does not know the transmission direction of a second training signal, the number of second training signals received may be counted, and the wireless transmitter 110 notified of the order number in which the second training signal with the best reception state was received. Thus, of the plurality of transmission directivity response patterns having a null value in the previously selected transmission directions, the one that affords the best communication quality with the wireless receiver 120 (the communication partner device) is selected. This allows a transmission directivity response pattern with no side lobes with respect to the previously selected transmission directions to be reliably selected. Furthermore, by using this transmission directivity response pattern, communication can be performed by specifying the signal with the best communication quality out of those received through a communication path other than the communication paths corresponding to the previously selected reception directions. As a result, even if some of the communication paths are interrupted, communication can still continue.

Also, when the wireless receiver 120 uses the first directivity response pattern 131 and the second directivity response pattern 132, the reception state of second training signals is monitored for all of the pairs of candidates for the transmission-use second direction and the reception-use second direction (S810 to S812). The transmission direction and reception direction with the best reception state are then selected as the paired transmission-use second direction 102 and reception-use second direction 122. A direction in which the communication quality is not the best may not be selected, and any transmission direction and reception direction that satisfy a specific level of quality may be selected as the paired transmission-use second direction 102 and reception-use second direction 122. Specifically, all of the candidates for the paired transmission direction and reception direction may be examined for whether or not the communication quality exceeds the specified quality, and the paired transmission-use second direction 102 and reception-use second direction 122 may be selected from among those transmission directions in which the communication quality does exceed the specified quality.

Upon completion of the selection of the transmission-use first direction 101 and the reception-use second direction 102, the redundancy of the first transmission directivity response pattern 111 and the second transmission directivity response pattern 112 is checked. If the result is a decision that redundancy is inadequate, the transmission-use second direction 102 is re-selected. Checking of redundancy is executed as follows, just as in FIG. 9, for example.

The wireless transmitter 110 forms a transmission directivity response pattern having its main lobe in the transmission-use first direction 101 under the condition that the area around the transmission-use second direction 102 is null, and sends a redundancy check signal (S911). The wireless receiver 120 compares the communication quality of the redundancy check signal with a predetermined threshold, and determines whether the redundancy is adequate or inadequate (S920). If the redundancy is decided to be inadequate, the area around the transmission-use first direction 101 and the area around the transmission-use second direction prior to re-selection are set as the transmission null range, the directivity response pattern is reformed, and the transmission-use second direction 102 is re-selected (S902).

If the wireless receiver 120 uses the first directivity response pattern 131 and the second directivity response pattern 132, the redundancy is checked by forming a reception directivity response pattern having its main lobe in the reception-use first direction 121 that is paired with the transmission-use first direction 101, for example. In this case, a null value is formed in the reception direction 122 that is paired with the transmission-use second direction 102. If the redundancy is decided to be inadequate, the transmission-use second direction 102 and the reception-use second direction 122 are re-selected.

In this embodiment, this redundancy check is carried out because if the null value is formed in the transmission-use second direction in a transmission directivity response pattern having its main lobe in the transmission-use first direction 101, there may be situations in which communication quality will be unsatisfactory in the wireless receiver 120, which is the communication partner device. In the redundancy check, as discussed above, the communication quality of a signal is checked in the wireless receiver 120 for when using a transmission directivity response pattern having a null value in another transmission direction, including the last selected transmission direction. If this communication quality meets the specified quality, signals sent from the selected transmission directions can be received by the wireless receiver 120 through different paths, and communication can be continued even if some of the paths are disconnected.

Figure 12:
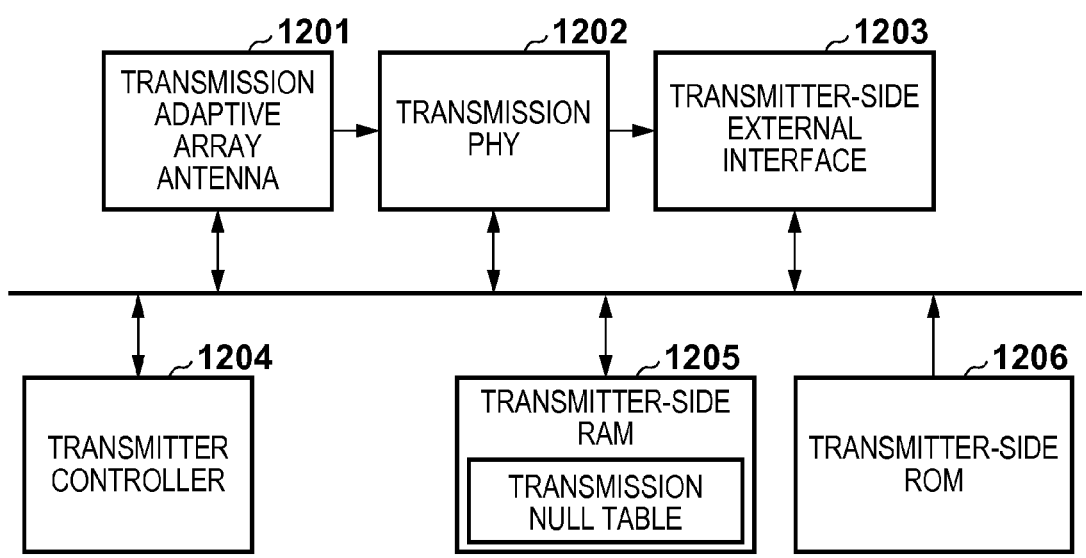
FIG. 12 is a block diagram of an example of the configuration of a wireless transmitter.

FIG. 12 is a block diagram of an example of the configuration of the wireless transmitter 110 in the wireless communication system of this embodiment. A transmitter-side external interface 1203 converts the transmission data inputted from an external device connected to the wireless transmitter 110 into a suitable format, and outputs it to a transmission PHY 1202. The transmission PHY 1202 modulates input signals from the transmitter-side external interface 1203, and outputs them to a transmission adaptive array antenna 1201. The transmission adaptive array antenna 1201 varies the transmission directivity response pattern, and transmits signals inputted from the transmission PHY 1202. The transmission adaptive array antenna 1201 may include a beam formation controller (not shown) for variably controlling the transmission directivity response pattern. The function of a beam formation controller may also be had by a transmitter controller 1204. The transmitter controller 1204 controls the operation of the entire wireless transmitter 110. A transmitter-side RAM 1205 temporarily stores parameters and data. A transmission null table used to determine the transmission-use second direction is provided to the transmitter-side RAM 1205. A transmitter-side ROM 1206 stores nonvolatile parameters and programs of the wireless transmitter 110.

Embodiment 3

In Embodiments 1 and 2, the wireless receiver and/or the wireless transmitter transferred data in two directivity response patterns. In this embodiment will be described a case of transferring data in a plurality of (M number, where M>2) directivity response patterns. To simplify the description, a case of performing directivity response control with just the wireless receiver 120 will be discussed. It will be clear from Embodiment 2 that directivity response patterns can be established in the same way when directivity response control is performed with just the wireless receiver 120, and when directivity response control with both the wireless receiver 120 and the wireless transmitter 110.

The wireless transmitter 110 sends M number of signals produced from the same source data at different times (M>2). The m-th signal sent here is called the sub-slot m (1≤m≤M). The wireless receiver 120 forms a reception directivity response pattern having its main lobe in the m-th direction under the condition that the reception-use first to m−1-th direction or its surrounding area is null, and receives the sub-slot m. This directivity response pattern can be formed by using an eigenvector corresponding to the maximum eigenvalue of X defined in Formula 3 as an antenna weight, just as in Embodiment 1, for example.

Figure 13:
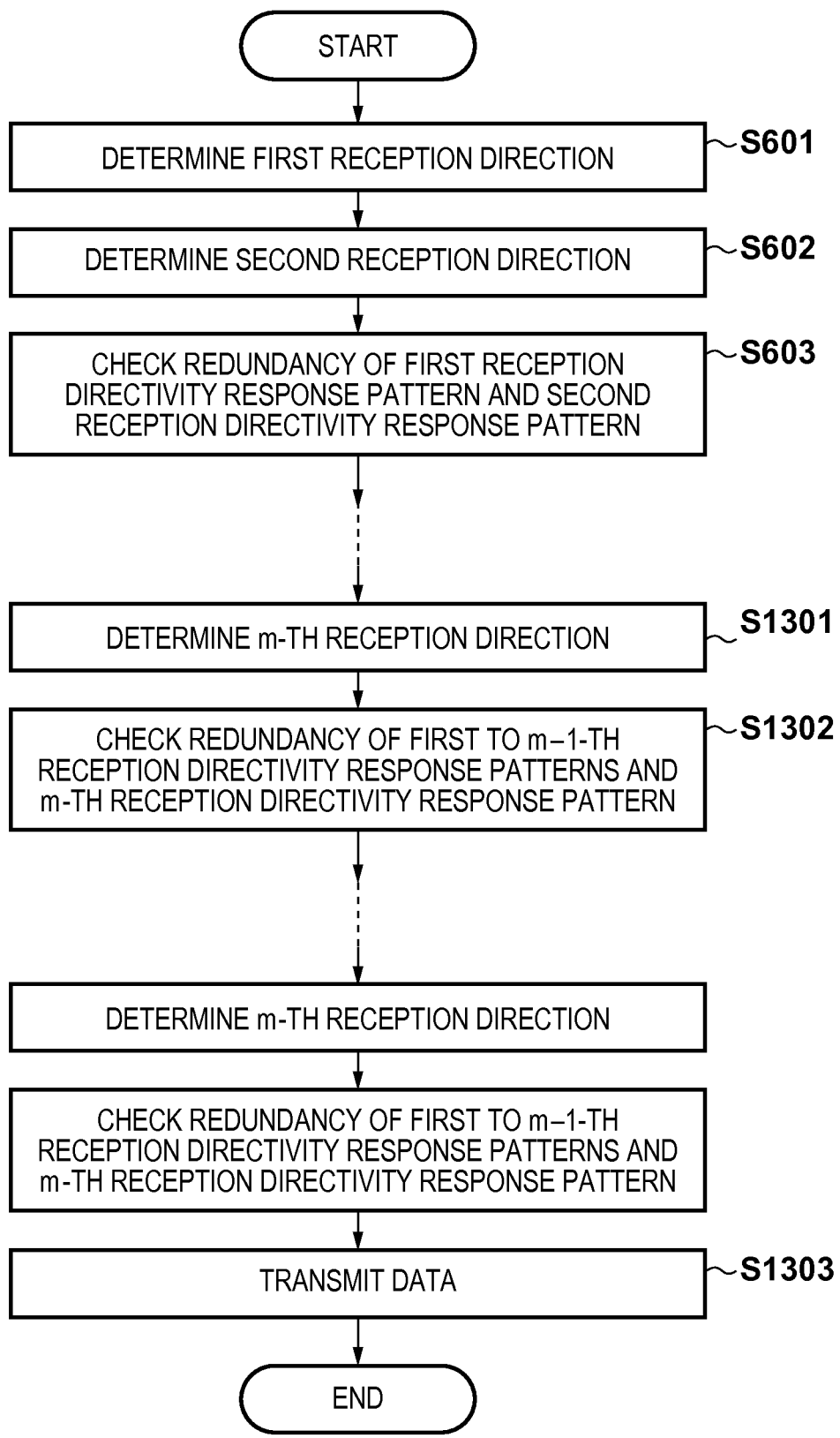
FIG. 13 is a flowchart of the operation of the wireless communication system according to Embodiment 3.

FIG. 13 is a flowchart of an example of the flow of the wireless communication system in this embodiment. First, just as in Embodiment 1, the first directivity response pattern 131 is selected, the second directivity response pattern 132 is selected, and the redundancy of the first directivity response pattern 131 and the second directivity response pattern 132 is checked (S601 to S603). If the redundancy is decided to be inadequate, the reception-use second direction 122 is re-selected.

Then, the wireless receiver 120 selects the m-th reception directivity response as follows (S1301). Let us assume here that the wireless transmitter 110 is continuously transmitting the m-th training signal. The wireless receiver 120 forms reception directivity response patterns whose main lobes are the candidates for the reception-use m-th direction under the condition that the reception-use first to m-th directions or their surroundings are null, and receives the m-th training signal. The reception-use m-th direction is selected on the basis of the reception state of the m-th training signal.

After the reception-use m-th direction is selected, the wireless receiver 120 checks the redundancy of the m-th reception directivity response pattern and the first to m−1-th reception directivity response patterns 131 as follows (S1302). The wireless transmitter 110 repeats transmission of the redundancy check signal m−1 times. This is because reception directivity response patterns having their main lobes in the reception-use first to m−1-th directions are formed while forming a null value in the reception-use m-th direction or its surrounding area, and redundancy is checked for each of these patterns. The wireless receiver 120 forms a reception directivity response pattern having its main lobe in the first direction 121 while forming a null value in the reception-use second to m-th directions or their surroundings, and receives a first redundancy check signal just as in S911 of FIG. 9. Similarly, a reception directivity response pattern having its main lobe in the first direction (1≤l≤m−1) while forming a null value in the reception-use first to l−1-th and l+1-th to m-th directions and their surroundings, and receives the first redundancy check signal. The wireless receiver 120 compares the reception state of the redundancy check signal received the m−1-th time with a predetermined threshold, and determines whether the redundancy is adequate or inadequate. If the redundancy is determined to be inadequate at least once, the directivity response pattern is reformed by resetting the reception-use first to m-th directions or their surroundings and the m-th direction or its surrounding area prior to re-selection as the reception null range, and the m-th direction, that is, the last selected direction, is re-selected. Thereafter the same procedure is repeated to establish the first to M-th reception directivity response patterns, and these reception directivity response patterns are used to perform data transfer (S1303).

The result of the above is that a plurality of paths can be utilized, and even if some of these usable paths are disconnected by an obstacle or the like, it will still be possible to continue communication. Incidentally, the null reception gain and transmission gain described in the above embodiments do not need to be completely zero, as long as they are low enough not to affect that attainment of the desired communication quality. Similarly, as long as the main lobe reception gain and transmission gain are large enough not to affect that attainment of the desired communication quality, the reception power in the directivity response patterns need not be the maximum.

The above description is merely an example of embodiments of the present invention, and it should go without saying that the present invention is not limited to or by these embodiments.

With the present invention, the likelihood that communication will be cut off with a plurality of directivity response patterns is reduced, and the reliability of communication can be improved.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-226224 filed on Oct. 13, 2011, which is hereby incorporated by reference herein in its entirety.

What is claimed is:

1. A wireless communication device, comprising:
a formation unit configured to form a second spatial directivity response pattern having a null value in the spatial direction of a main lobe of a first spatial directivity response pattern; and
a communication unit configured to communicate with a communication partner device by using the first spatial directivity response pattern and the second spatial directivity response pattern.

2. The wireless communication device according to claim 1,
further comprising a determination unit configured to determine a second spatial direction that is the spatial direction of a main lobe of the second spatial directivity response pattern, setting a first spatial direction that is the spatial direction of the main lobe of the first spatial directivity response pattern to a null value.

3. The wireless communication device according to claim 1,
further comprising a selection unit configured to select the spatial direction of the main lobe on the basis of signal communication quality, from among spatial directivity response patterns having main lobes in different spatial directions.

4. The wireless communication device according to claim 3,
wherein the selection unit re-selects the spatial direction last selected when the communication quality does not reach a specific level upon using a spatial directivity response pattern having a main lobe in one of the selected spatial directions and having a null value in the other selected spatial directions.

5. The wireless communication device according to claim 4,
wherein the selection unit re-selects the spatial direction of a main lobe on the basis of the signal communication quality, from among spatial directivity response patterns having main lobes in different spatial directions, said spatial directivity response patterns forming a null value in the last selected spatial direction and in the previously selected spatial direction.

6. The wireless communication device according to claim 1,
further comprising an examination unit configured to examine whether or not the communication quality with a communication partner exceeds a specific level,
wherein the formation unit forms a spatial directivity response pattern with which the communication quality with the communication partner device according to the examination unit exceeds a specific level.

7. The wireless communication device according to claim 1,
further comprising a check unit configured to check whether or not the communication quality with a communication partner exceeds a specific level, for the first spatial directivity response pattern and for the second spatial directivity response pattern,
wherein the formation unit reforms a spatial directivity response pattern different from the previously formed second spatial directivity response pattern, according to a checking result by the check unit.

8. The wireless communication device according to claim 1,
wherein the formation unit selects a second reception spatial directivity response pattern having a null value in the reception spatial direction of a main lobe of a first reception spatial directivity response pattern.

9. The wireless communication device according to claim 1,
wherein the formation unit selects a second transmission spatial directivity response pattern having a null value in the transmission spatial direction of a main lobe of a first transmission spatial directivity response pattern.

10. The wireless communication device according to claim 1,
wherein the communication unit switches its communication between the first spatial directivity response pattern and the second spatial directivity response pattern.

11. A wireless communication device, comprising:
a communication unit configured to communicate by utilizing a plurality of spatial paths, including a first spatial path formed by a first spatial directivity response pattern in which a first spatial direction serves as a main lobe, and a second spatial path formed by a second spatial directivity response pattern in which a second spatial direction different from the first spatial direction serves as a main lobe; and a determination unit configured to determine as the second spatial direction the spatial direction of the main lobe of a spatial directivity response pattern having a null value in the first spatial direction of the main lobe of the first spatial directivity response pattern.

12. A wireless communication device, comprising: device comprising:
a formation unit configured to form a first spatial directivity response pattern in which a first spatial direction serves as a main lobe, and a second spatial directivity response pattern in which a second spatial direction serves as a main lobe, and
a determination unit configured to determine the second spatial direction on the basis of the communication quality with the spatial directivity response pattern forming a null value in the first spatial direction.

13. The wireless communication device according to claim 12,
wherein the second spatial directivity response pattern forms a null value in the first spatial direction.

14. A communication method used in a wireless communication device; comprising:
a formation step of forming a second spatial directivity response pattern having a null value in the spatial direction of a main lobe of a first spatial directivity response pattern; and
a communication step of communicating with a communication partner device by using the first directivity response pattern and the second spatial directivity response pattern.

15. A non-transitory computer-readable storage medium storing a computer program for causing a computer provided in a wireless communication device to execute the following steps:
a formation step of forming a second spatial directivity response pattern having a null value in the spatial direction of a main lobe of a first spatial directivity response pattern; and
a communication step of communicating with a communication partner device by using the first spatial directivity response pattern and the second spatial directivity response pattern.

16. A communication method used in a wireless communication device, comprising:
a communication step of communicating by utilizing a plurality of spatial paths, including a first spatial path formed by a first spatial directivity response pattern in which a first spatial direction serves as a main lobe, and a second spatial path formed by a second spatial directivity response pattern in which a second spatial direction different from the first spatial direction serves as a main lobe; and
a determination step of determining as the second spatial direction the spatial direction of the main lobe of a spatial directivity response pattern having a null value in the first spatial direction of the main lobe of the first spatial directivity response pattern.

17. A non-transitory computer-readable storage medium storing a computer program for causing a computer provided in a wireless communication device to execute the following steps:
a communication step of communicating by utilizing a plurality of spatial paths, including a first spatial path formed by a first spatial directivity response pattern in which a first spatial direction serves as a main lobe, and a second spatial path formed by a second spatial directivity response pattern in which a second spatial direction different from the first spatial direction serves as a main lobe; and
a determination step of determining as the second spatial direction the spatial direction of the main lobe of a spatial directivity response pattern having a null value in the first spatial direction of the main lobe of the first spatial directivity response pattern.

18. A communication method used in a wireless communication device, comprising:
a formation step of forming a first spatial directivity response pattern in which a first spatial direction serves as a main lobe, and a second spatial directivity response pattern in which a second spatial direction serves as a main lobe,
wherein in the formation step, the second spatial direction is selected on the basis of a signal reception state in a spatial directivity response pattern forming a null value in the first spatial direction.

19. A non-transitory computer-readable storage medium storing a computer program for causing a computer provided in a wireless communication device to execute the following steps:
a formation step of forming a first spatial directivity response pattern in which a first spatial direction serves as a main lobe, and a second spatial directivity response pattern in which a second spatial direction serves as a main lobe,
wherein in the formation step, the second spatial direction is selected on the basis of a signal reception state in a spatial directivity response pattern forming a null value in the first spatial direction.

* * * * *